Feb. 14, 1961  H. C. ROHR  2,971,785
WIPER ARM CONNECTION
Filed June 19, 1957
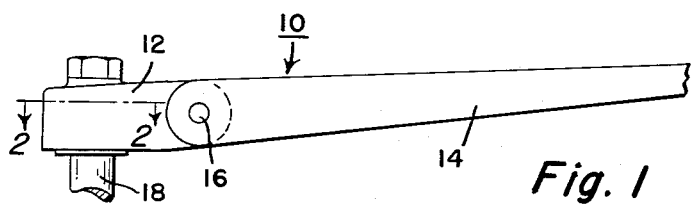
Fig. 1
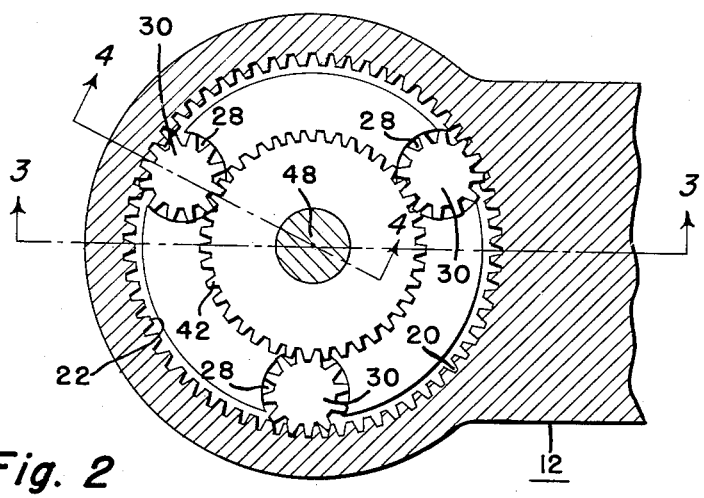
Fig. 2
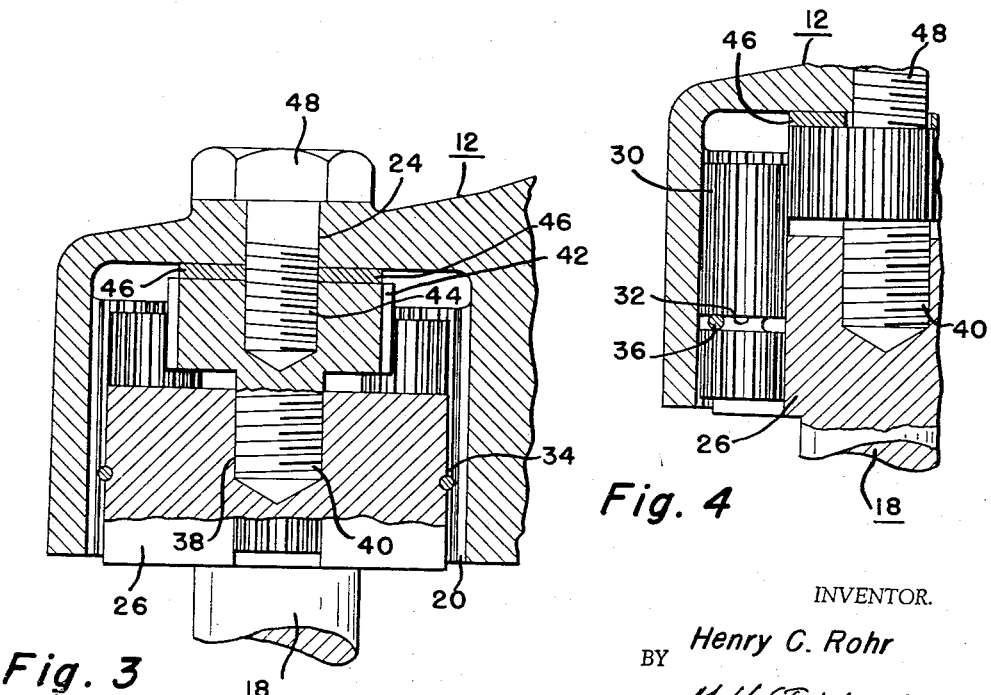
Fig. 3
Fig. 4
INVENTOR.
BY Henry C. Rohr
G. H. Strickland
His Attorney

United States Patent Office 2,971,785
Patented Feb. 14, 1961

2,971,785

WIPER ARM CONNECTION

Henry C. Rohr, Fort Lauderdale, Fla., assignor to General Motors Corporation, Detroit, Mich., a corporation of Delaware Filed June 19, 1957, Ser. No. 666,516

9 Claims. (Cl. 287—53)

This invention pertains to windshield wipers, and particularly to improved means for connecting a wiper arm to a wiper actuating shaft.

Heretofore, it has been customary to connect a wiper arm to a wiper actuating shaft by means of complementary serrated parts, i.e., a socket section having a plurality of relatively coarse longitudinally extending internal serrations which is telescoped over a key, or drum, member having a plurality of relatively fine longitudinally extending serrations. The key member may be integral with or suitably attached to the wiper actuating shaft, and these complementary serrated parts enable the arm to be angularly adjusted in increments relative to the key part as determined by engagement of the teeth on the complementary serrated parts. However, this type of connection does not permit the arm to be angularly adjusted relative to the shaft to any position since the complementary serrated parts must be moved relative to each other throughout a distance of at least one tooth. The present invention relates to connecting means which permit the arm to be secured to the shaft in exactly the desired angular position. Accordingly, among my objects are the provision of means whereby a wiper arm may be readily connected to and disconnected from an actuating member, the further provision of connecting means for a wiper arm and an actuating member whereby the arm can be angularly adjusted to any exact position relative to the actuating member; and the still further provision of means for securing a wiper arm to its actuating shaft and means for angularly adjusting the position of the arm relative to the shaft without removing the arm from the shaft.

The aforementioned and other objects are accomplished in the present invention by embodying a planetary gear set in the connection means between the wiper arm and the wiper actuating shaft. Specifically, the wiper arm includes an inner shaft receiving, or socket, portion which preferably comprises a die casting and is made in the form of a cap having a cylindrical recess with a central hole therethrough. The cylinder wall of the recess has gear teeth formed integrally therewith, and constitutes a ring gear of the planetary gear set. The wiper actuating shaft has a head portion, or drum, which may be a separate part secured to the shaft or constitute an integral enlargement thereof. The head portion has three circumferentially spaced peripheral slots of circular cross-section therein, and an annular groove intersecting the peripheral slots.

Three pinions, constituting planet pinions, are received in the peripheral slots of the head portion, the pinions having an annular groove therein. The planet pinions are restrained against axial movement relative to the head portion by a retaining ring but are free to rotate relative to the head portion. In addition, the head portion has a centrally threaded hole therein which receives a stud integral with a sun gear. The sun gear meshes with the planet gears, and by reason of having a threaded connection with the head portion, the sun gear can rotate relative to the head portion. The axial movement of the sun gear which accompanies rotation thereof is limited by engagement of the sun gear with the end of the head portion, or drum, of the shaft.

The sun gear has a threaded hole therein, the threads in the sun gear being of opposite sense to the threads in the head member. In the particular embodiment disclosed, the threads in the head portion are of the left hand type whereas the threads in the sun gear are of the right hand type. When the socket section is telescopically mounted over the head portion of the shaft, the ring gear engages the planet pinions, and with the sun gear free to rotate the socket section of the arm can be angularly adjusted to any position relative to the shaft. The threaded hole in the sun gear receives a bolt, a friction washer being interposed between the upper surface of the sun gear and the socket section. When the bolt is loose, the wiper arm can be moved angularly relative to the shaft since the planet pinions and the sun gear are free to rotate relative to the shaft. Thus, the arm can be set exactly in the desired position. When the bolt is tightened rotation of the sun gear relative to the shaft is precluded, the sun gear is locked to the ring gear, and, hence, the arm is connected to the shaft for movement therewith.

Further objects and advantages of the present invention will be apparent from the following description, reference being had to the accompanying drawing, wherein a preferred form of the present invention is clearly shown.

In the drawing:

Figure 1 is a fragmentary side view of the windshield wiper arm and shaft assembly constructed according to this invention.

Figure 2 is a fragmentary sectional view taken along line 2—2 of Figure 1.

Figure 3 is a view, partly in section and partly in elevation, taken along line 3—3 of Figure 2.

Figure 4 is a sectional view taken along line 4—4 of Figure 2.

With particular reference to the drawing, a windshield cleaner is shown including an arm 10 having an inner shaft receiving, or socket portion 12 and an outer blade carrying portion 14, hingedly connected thereto by means of a pivot pin 16. The shaft receiving portion 12 is telescopically mounted over the end of a wiper actuating shaft 18 which can be oscillated by any means well known in the art. Moreover, in accordance with conventional practice, the inner and outer arm parts 12 and 14 may be connected by any suitable resilient means, not shown, for applying pressure to the outer arm section 14 so that the blade carried thereby is maintained under pressure in contact with the windshield surface to be cleaned.

With particular reference to Figures 2 through 4, the socket portion 12 preferably comprises a die casting and is formed with a cylindrical recess 20. As seen particularly in Figure 2, the cylindrical recess 20 is formed with integral gear teeth on the cylindrical wall thereof as indicated by numeral 22. In addition, the upper surface of the socket section 12 has a hole 24 therein, which connects with the cylindrical recess 20, the hole 24 being coaxial with the cylindrical recess. The gear teeth 22 formed on the cylindrical wall of the recess constitute the ring gear of a planetary gear set, to be described.

The shaft 18 has a head portion, or drum, 26. The head portion 26 may be a separate part suitably secured to the shaft 18, or may constitute an integral enlargement thereof. The head portion 26, as seen particularly in Figure 2, has three longitudinally extending slots 28 therein spaced 120° apart, the slots being circular in cross-section. The slots 28 intersect the outer periphery of the head portion 26, and a planet pinion 30 is disposed within each slot. As seen particularly in Figure 4, each planet pinion 30 has an intermediate annular groove 32, and as seen in Figure 3 the head portion 26 has an annular groove 34 which intersects the slots 28. The planet pinions are free to rotate relative to the head portion 26, but are restrained against axial movement relative thereto by a snap ring 36 disposed within the annular groove 34 of the head member and having portions engaging the grooves 36 in the planet pinions.

The head member 26 is also formed with a coaxially located threaded hole 38. In the disclosed embodiment, the hole 38 has left hand screw threads and is arranged to receive a threaded stud 40 integral with a sun gear 42. The sun gear meshes with the planet pinions 30 as shown in Figure 2. Rotation of the sun gear 42 relative to the head portion 26 is accompanied by axial movement of the sun gear by reason of the threaded connection between the stud 40 and the head portion 26. The sun gear 42 can move axially downward, as viewed in Figure 3 until the sun gear engages the upper surface of the drum 26. The sun gear 42 is formed with a coaxially arranged threaded hole 44 having right hand screw threads. A friction washer 46 is placed on top of the sun gear 42, and when the socket portion 12 is telescopically mounted over the head portion 26, the head portion 26 can be locked to the shaft 18 by a bolt 48 which extends through the hole 24 in the socket section and threadedly engages the hole 44 in the sun gear.

When the bolt 48 is tightened, the sun gear 42 is restrained against rotation relative to the head portion 26 and the socket portion 12. By virtue of the fact that the threaded connections between the bolt 48 and the sun gear 42, and between the stud 40 and the head portion 26 are of opposite sense, the arm 10 is securely connected to the shaft 18 for movement therewith. To remove the arm 10 from the shaft 18 it is only necessary to remove the bolt 48, after which the arm can be lifted off the head portion 26. To adjust the angular position of the arm relative to the shaft 18, it is only necessary to loosen the bolt 48 and move the arm 10. Angular movement of the socket portion 12 relative to the head portion 26 and the shaft 18 is permitted when the bolt 48 is loosened, since the sun gear is free to rotate and is driven by the planet pinions when the socket portion is angularly adjusted due to the driving connection between the ring gear teeth 22 and the planet pinions. This arrangement permits the arm to be set in exactly the desired position without removing the arm from the shaft. The sun gear 42 is made of sufficient axial width so that the socket portion 12 can be rotated 360° relative to the head portion 26 without disengaging the teeth of the sun gear and the teeth of the planet pinions, or unscrewing the sun gear from the threaded hole 38. The head portion 26 constitutes the planet carrier, and when the bolt 48 is tightened the driving connection between the shaft 18 and the socket section 12 is through head portion 26 and the planet pinions 30 to the ring gear of the socket portion.

From the foregoing it is apparent that the present invention provides an arm to shaft connection wherein the arm can be exactly set in any desired angular position relative to the shaft. Moreover, the arm can be adjusted angularly relative to the shaft without removing the arm from the shaft. Furthermore, the arm is securely connected to the shaft by readily detachable means comprising a bolt.

While the embodiment of the invention as herein disclosed constitutes a preferred form, it is to be understood that other forms might be adopted, as may come within the scope of the claims which follow.

What is claimed is as follows:

1. In combination, a wiper actuating member having a head portion, a wiper arm having a socket portion telescoped over said head portion, gear means rotatably supported by the head portion and drivingly engaging the socket portion permitting relative angular movement between the socket portion and the head portion throughout at least one complete revolution, and means carried by one of said portions and engageable with said gear means for locking said gear means against rotation relative to the head portion to establish a driving connection between said actuating member and said socket portion at an infinite number of angular positions of the socket relative to said head portion.

2. In combination, a wiper actuating member having a head portion, a wiper arm having a socket portion telescoped over said head portion, a planetary gear set interconnecting said socket portion and said head portion including parts carried by both of said portions, and releasable means carried by one of said portions and engageable with one of the parts of said planetary gear set for locking said one part against rotation relative to said actuating member, said releasable locking means permitting angular movement of the socket portion relative to the head portion throughout at least one complete revolution, when released, and establishing a driving connection between said actuating member and said socket portion at an infinite number of angular positions of the socket relative to the head portion, when engaged.

3. In a windshield cleaner, a shaft having a head portion with a plurality of longitudinal extending slots, a planet pinion rotatably supported in each slot, a sun gear supported for rotation relative to said head portion and engaging said planet pinions, a wiper arm part having a cylindrical recess with integral gear teeth constituting a ring gear telescoped over said head portion and engaging said planet pinions, and releasable means carried by the arm part and engageable with the sun gear for securing the arm part to the sun gear whereby the arm part is rotatable relative to the shaft throughout at least one complete revolution, when said means are released, and connected to the shaft for movement therewith at an infinite number of angular positions of said arm relative to said head portion, when said means are engaged.

4. In combination, a wiper actuating member having a head portion, a wiper arm having a socket portion telescoped over said head portion, a planetary gear set interconnecting said socket portion and said head portion including a ring gear integral with one of said portions and a plurality of planet pinions and a sun gear carried by the other of said portions, and releasable means carried by said one portion and engageable with said sun gear for locking the sun gear against rotation relative to said other portion, said releasable locking means permitting angular movement of the socket portion relative to the head portion throughout at least one complete revolution, when released, and establishing a driving connection between said actuating member and said socket portion at an infinite number of angular positions of the socket portion relative to the head portion, when engaged.

5. In combination, a wiper actuating member having a head portion, a wiper arm having a socket portion telescoped over said head portion, a planetary gear set interconnecting said portions including a ring gear integal with the socket porton, a plurality of planet pinions rotatably carried by said head portion and a sun gear rotatably supported by said head portion, and releasable means carried by said socket portion and engageable with said sun gear for locking said sun gear against rotation relative to said head portion, said releasable locking means permitting angular movement of the socket portion relative to the head portion throughout at least one complete revolution, when released, and establishing a driving connection between the actuating member and the socket portion at an infinite number of angular positions of said socket portion relative to said head portion, when engaged.

6. In a windshield cleaner, a shaft having a head portion with a plurality of longitudinally extending slots, a planet pinion rotatably supported in each slot, a sun gear having a threaded engagement with said head portion and engaging said planet pinions, a wiper arm part having a cylindrical recess with integral gear teeth constituting a ring gear telescoped over said head portion and engaging said planet pinions, and releasable locking means carried by said arm part and engageable with said sun gear for preventing rotation of said sun gear relative to said head portion whereby the arm part can be rotated relative to the head portion throughout at least one complete revolution, when said locking means are released, and locked to the head portion at an infinite number of angular positions of said arm part relative to said head portion, when said locking means are engaged.

7. In a windshield cleaner, a shaft having a head portion with a plurality of longitudinally extending slots, a planet pinion rotatably supported in each slot, a snap ring engaging the planet pinions and the head portion preventing relative axial movement therebetween, a sun gear supported for rotation relative to the head portion and engaging said planet pinions, a wiper arm part having a cylindrical recess with integral gear teeth constituting a ring gear telescoped over said head portion and engaging said planet pinions, and releasable locking means carried by said arm part and engageable with said sun gear for securing the arm part to the sun gear whereby the arm part is rotatable relative to the shaft throughout at least one complete revolution, when said locking means are released, and locked to the shaft for movement therewith at an infinite number of angular positions of the arm part relative to the head portion, when said locking means are engaged.

8. In a windshield cleaner, a shaft having a head portion with a plurality of longitudinally extending slots, a planet pinion rotatably supported in each slot, a sun gear having a threaded connection with said head portion so as to be rotatable relative thereto and engaging said planet pinions, a wiper arm part having a cylindrical recess with integral gear teeth constituting a ring gear telescoped over said head portion and engaging said planet pinions, and releasable locking means carried by said arm part and having threaded engagement with said sun gear for securing the arm part to the sun gear whereby the arm part can be rotated relative to the shaft throughout at least one complete revolution when the locking means are released, and secured to the shaft for movement therewith at an infinite number of angular positions of the arm part relative to the head portion, when the locking means are engaged.

9. In a windshield cleaner, a shaft having a head portion with a plurality of longitudinally extending slots, a planet pinion rotatably supported in each slot, a snap ring engaging the planet pinions and the head portion for preventing relative axial movement therebetween, a sun gear having threaded engagement with said head portion and engaging said planet pinions, a wiper arm part having a cylindrical recess with integral gear teeth constituting a ring gear telescoped over said head portion and engaging said planet pinions, and a locking member carried by said arm part having threaded engagement with said sun gear, the threaded engagement between the sun gear and the head portion being of a sense opposite to the threaded engagement between the locking member and the sun gear.

References Cited in the file of this patent

UNITED STATES PATENTS

| | | |
|---|---|---|
| 1,205,861 | Cushing et al. | Nov. 21, 1916 |
| 1,453,256 | Ganz | Apr. 24, 1923 |
| 1,642,325 | Bleoo | Sept. 13, 1927 |
| 2,738,535 | Horton | Mar. 20, 1956 |
| 2,773,712 | Chambers | Dec. 11, 1956 |